(12) United States Patent
Mangen et al.

(10) Patent No.: US 9,877,426 B2
(45) Date of Patent: Jan. 30, 2018

(54) AGRICULTURAL IMPLEMENT WITH AUTOMATED RECOGNITION OF CHEMICAL TOTE CONTENTS

(71) Applicant: CNH Industrial America LLC, New Holland, PA (US)

(72) Inventors: Lyle P. Mangen, Willmar, MN (US); Aaron R. Tollefsrud, Willmar, MN (US); Todd T. Taylor, Kendalville, IN (US)

(73) Assignee: CNH Industrial America LLC, New Holland, PA (US)

( * ) Notice: Subject to any disclaimer, the term of this patent is extended or adjusted under 35 U.S.C. 154(b) by 849 days.

(21) Appl. No.: 13/859,214

(22) Filed: Apr. 9, 2013

(65) Prior Publication Data
US 2014/0277781 A1    Sep. 18, 2014

Related U.S. Application Data

(63) Continuation-in-part of application No. 13/796,637, filed on Mar. 12, 2013, now Pat. No. 9,265,194.

(51) Int. Cl.
*A01M 7/00* (2006.01)
*A01C 21/00* (2006.01)

(52) U.S. Cl.
CPC ........... *A01C 21/00* (2013.01); *A01M 7/0042* (2013.01); *A01M 7/0082* (2013.01); *A01M 7/0092* (2013.01)

(58) Field of Classification Search
CPC .............. A01M 7/0092; A01M 7/0042; A01M 7/0089; A01M 7/0082; A01M 7/0085; A01C 21/00; A01B 79/005; A01B 51/026; B05B 12/1418; B05B 7/26; G06K 19/07749
USPC ............. 239/1, 146; 340/572.1, 10.52, 13.26
See application file for complete search history.

(56) References Cited

U.S. PATENT DOCUMENTS

| | | | |
|---|---|---|---|
| 3,385,478 A | | 5/1968 | Miller et al. |
| 4,121,767 A | * | 10/1978 | Jensen ................. A01M 7/0092 137/92 |
| 4,580,721 A | * | 4/1986 | Coffee ...................... B05B 5/16 222/23 |
| 4,629,164 A | * | 12/1986 | Sommerville ...... A01M 7/0092 222/23 |
| 5,009,344 A | | 4/1991 | Cooley |
| 5,704,546 A | * | 1/1998 | Henderson .............. B05B 12/00 239/1 |
| 5,755,382 A | * | 5/1998 | Skotinkov ............ A01B 51/026 180/411 |

(Continued)

*Primary Examiner* — Arthur O Hall
*Assistant Examiner* — Juan C Barrera
(74) *Attorney, Agent, or Firm* — Rebecca L. Henkel; Rickard K. DeMille

(57) ABSTRACT

An agricultural implement for applying an active ingredient to a geographic area includes a chassis, and at least one active ingredient tank. Each active ingredient tank is removably positioned on and carried by the chassis. Each active ingredient tank contains an active ingredient therein which is to be applied to the geographic area. Each active ingredient tank has an identification (ID) tag representing data associated with the active ingredient. An electrical reader carried by the chassis is configured for reading the ID tag and providing an output signal. An electrical processing circuit is coupled with the reader and receives the output signal.

9 Claims, 7 Drawing Sheets

(56) References Cited

U.S. PATENT DOCUMENTS

| | | |
|---|---|---|
| 6,584,919 B2 | 7/2003 | McQuinn |
| 6,708,631 B1 | 3/2004 | McQuinn et al. |
| 7,086,342 B2 | 8/2006 | O'Neall et al. |
| 7,957,850 B2 | 6/2011 | Anderson |
| 2005/0127090 A1* | 6/2005 | Sayers ................. A47K 5/1217 222/1 |
| 2010/0032492 A1* | 2/2010 | Grimm ............... A01M 7/0089 239/1 |

* cited by examiner

AGRICULTURAL IMPLEMENT WITH AUTOMATED RECOGNITION OF CHEMICAL TOTE CONTENTS

CROSS REFERENCE TO RELATED APPLICATIONS

This is a continuation-in-part of U.S. patent application Ser. No. 13/796,637, entitled "AGRICULTURAL SPRAYER WITH DEDICATED STORAGE AREA FOR AGRICULTURAL CHEMICAL TOTES", filed Mar. 12, 2013, which is incorporated herein by reference.

BACKGROUND OF THE INVENTION

1. Field of the Invention

The present invention relates to agricultural sprayers, and, more particularly, to such sprayers using a metered application with an onboard primary carrier tank and one or more agricultural chemical tanks.

2. Description of the Related Art

Agricultural sprayers apply a liquid to a crop or the ground at a specified application rate. The liquid may be in the form of a solution or mixture, with a carrier liquid (such as water) being mixed with one or more active ingredients (such as a herbicide, fertilizer and/or a pesticide). The application rate can vary over different parts of a field through the use of precision farming techniques, such as by using GPS data to activate/deactivate boom sections of the sprayer as the sprayer traverses over the field.

Agricultural sprayers may be pulled as an implement or self-propelled, and typically include a tank, a pump, a boom assembly, and a plurality of nozzles carried by the boom assembly at spaced locations. The boom assembly typically includes a pair of wing booms, with each wing boom extending to either side of the sprayer when in an unfolded state. Each wing boom may include multiple boom sections, each with a number of spray nozzles (also sometimes referred to as spray tips). Of course, a self-propelled sprayer also includes an onboard power plant (e.g., diesel engine) providing motive force and other power such as hydraulic power, electrical power, etc.

Agricultural sprayers may generally be divided into two types or methods of application: a batch application method, and a metered application method. With a batch application method, a tank is filled with the carrier liquid, one or more active ingredients are mixed with the carrier liquid in the tank, and the solution or mixture is applied at a predetermined application rate over the field (defined by vehicle travel speed, nozzle size and fluid operating pressure). A batch application method is effective but is not sensitive to different application needs across the field. Moreover, it is rarely the case where liquid in the tank is not left over at the end of spraying, which then must be discarded. These factors increase the operating costs associated with a batch application method.

With a metered application method, the active ingredient(s) are mixed at a metered rate with the carrier liquid as it is transferred from a carrier tank to the sprayer nozzles. Such metering may be carried out using pumps, venturi nozzles or controllable valves. A metered application method allows the application rate to be more easily changed "on-the-fly" across a field, and avoids the need to dispose of unused spray solution at the end of a spray operation (except what may be left in the lines, pump, etc. between the tank and nozzles).

Conventional sprayers using a metered application method include a carrier tank and one or more active ingredient tanks, all of which are permanently mounted to the sprayer chassis. The carrier liquid is pumped from a nurse tank (e.g., carried on a flat truck or trailer) to the carrier tank on the sprayer using a transfer pump and fill lines. Similarly, the active ingredient(s) are pumped from a nurse tank to a respective active ingredient tank on the sprayer using a transfer pump and fill lines. This method of refilling for both the carrier liquid and the active ingredients is effective but is time consuming and requires manual positioning and connection of the fill lines, starting the transfer pumps, etc.

What is needed in the art is an agricultural sprayer with metered application which reduces the downtime and effort associated with refilling the tanks.

What is further needed is a way of quickly and easily correlating information associated with an active ingredient tank with other relevant data for accurate and cost effective application of the active ingredient.

SUMMARY OF THE INVENTION

The present invention provides an agricultural implement with an onboard chemical tote, a reader for automatically reading data associated with the contents of the chemical tote, and a controller for matching precision farming data with the chemical tote contents data, and controlling application of the chemical based on the matched data.

The invention in one form is directed to an agricultural implement for applying an active ingredient to a geographic area. The agricultural implement includes a chassis, and at least one active ingredient tank, with each active ingredient tank being removably positioned on and carried by the chassis. Each active ingredient tank contains an active ingredient therein which is to be applied to the geographic area. Each active ingredient tank has an identification (ID) tag representing data associated with the active ingredient. An electrical reader carried by the chassis is configured for reading the ID tag and providing an output signal. An electrical processing circuit is coupled with the reader and receives the output signal.

In another form of the invention, the electrical processing circuit includes precision farming data associated with the geographic area, and matches the data associated with the active ingredient with the precision farming data to establish an application rate of the active ingredient over at least a portion of the geographic area.

The invention in yet another form is directed to a method of applying an active ingredient to a geographic area using an agricultural implement. The method includes the steps of: placing an active ingredient tank in a dedicated storage area onboard the agricultural implement, the active ingredient tank including an identification (ID) tag representing data associated with the active ingredient; reading the ID tag using a reader; outputting an output signal from the reader to an electrical processing circuit carried onboard the agricultural implement; and controlling application of the active ingredient to the geographic area using the electrical processing circuit.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
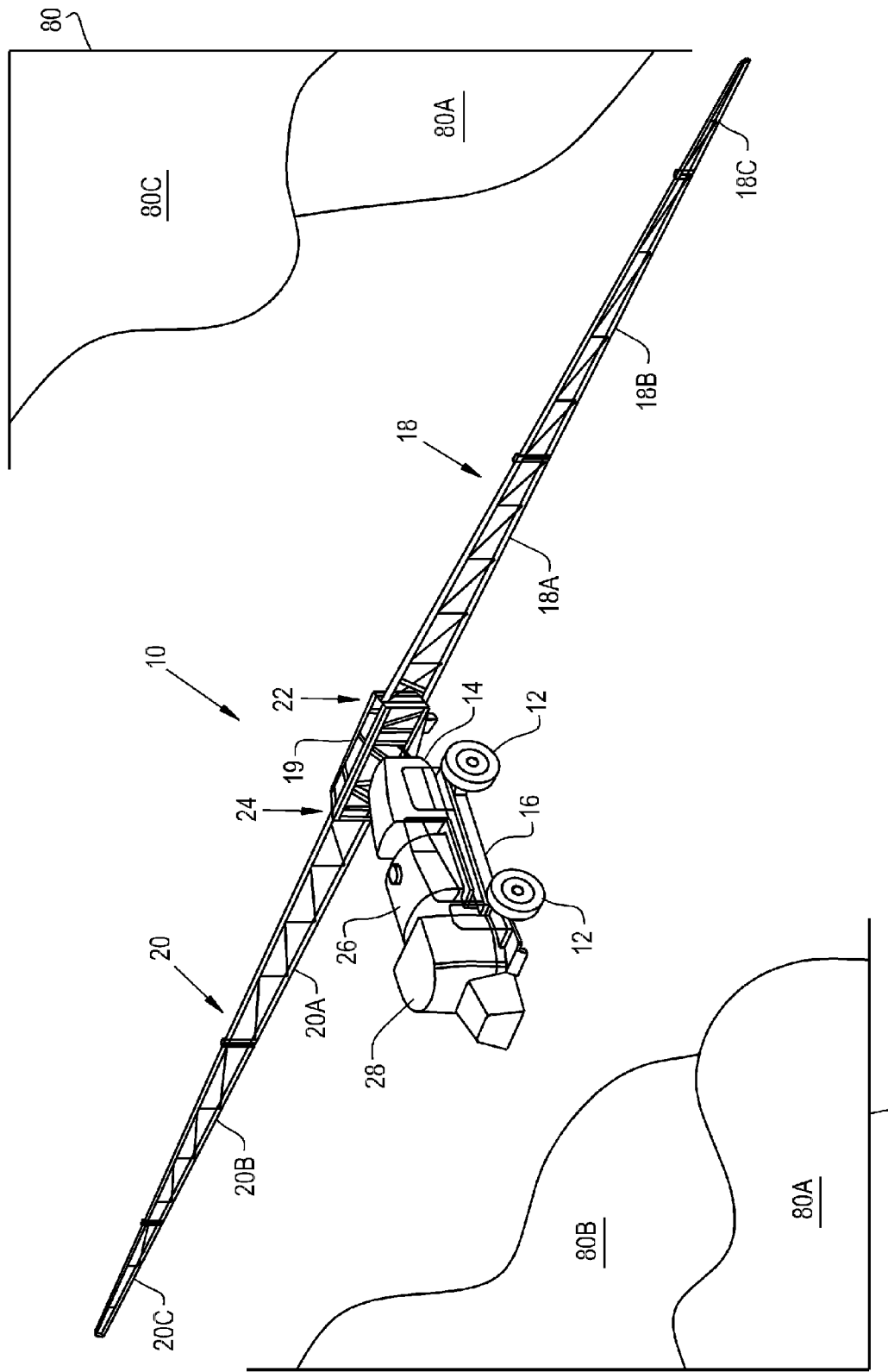
FIG. 1 is a perspective view of an embodiment of an agricultural sprayer of the present invention, shown traversing over a geographic area such as a field.

Referring now to the drawings, and more particularly to FIG. 1, there is shown an agricultural sprayer 10 according to one embodiment of the present invention. Agricultural sprayer 10 is shown as a self-propelled sprayer with a plurality of wheels 12 and a prime mover in the form of an internal combustion (IC) engine (e.g., diesel engine) within an engine compartment 14. However, agricultural sprayer 10 could also be configured as a towed sprayer which is towed behind a work vehicle such as a tractor. Moreover, agricultural sprayer could also be a track-type self-propelled vehicle for certain applications.

Agricultural sprayer 10 includes a chassis 16 to which a pair of wing booms 18, 20 are connected, united by a center boom 19. For sake of description, wing boom 18 is considered a left wing boom and wing boom 20 is considered a right wing boom. The wing booms 18, 20 are connected to center boom 19, joined about respective pivot connections 22, 24. Center boom 19 is connected at or near the rear of chassis 16. The wing booms 18, 20 are designed to fold forward toward the leading end of chassis 16 when wing booms 18, 20 are moved from an extended position, shown in FIG. 1, to a stowed or transport position (not shown).

Each wing boom 18, 20 supports a number of boom sections 18A, 18B, 18C, 20A, 20B and 20C. Center boom 19 and wing boom sections 18A, 18B, 18C, 20A, 20B and 20C each include a number of spray nozzles (not shown). In the embodiment shown, each wing boom has three boom sections, corresponding to the fold locations of the wing boom. In the illustrated embodiment, the spray nozzles of center boom 19 and wing boom sections 18A, 18B, 18C, 20A, 20B and 20C are fluidly connected in parallel relative to each other. Moreover, the spray nozzles within center boom 19 and a same wing boom section 18A, 18B, 18C, 20A, 20B or 20C are typically connected together in series. This arrangement of spray nozzles allows the spray nozzles of center boom 19 and wing boom sections 18A, 18B, 18C, 20A, 20B and 20C to be independently turned on and off as sprayer 10 advances across a field (e.g., using GPS data).

Figure 2:
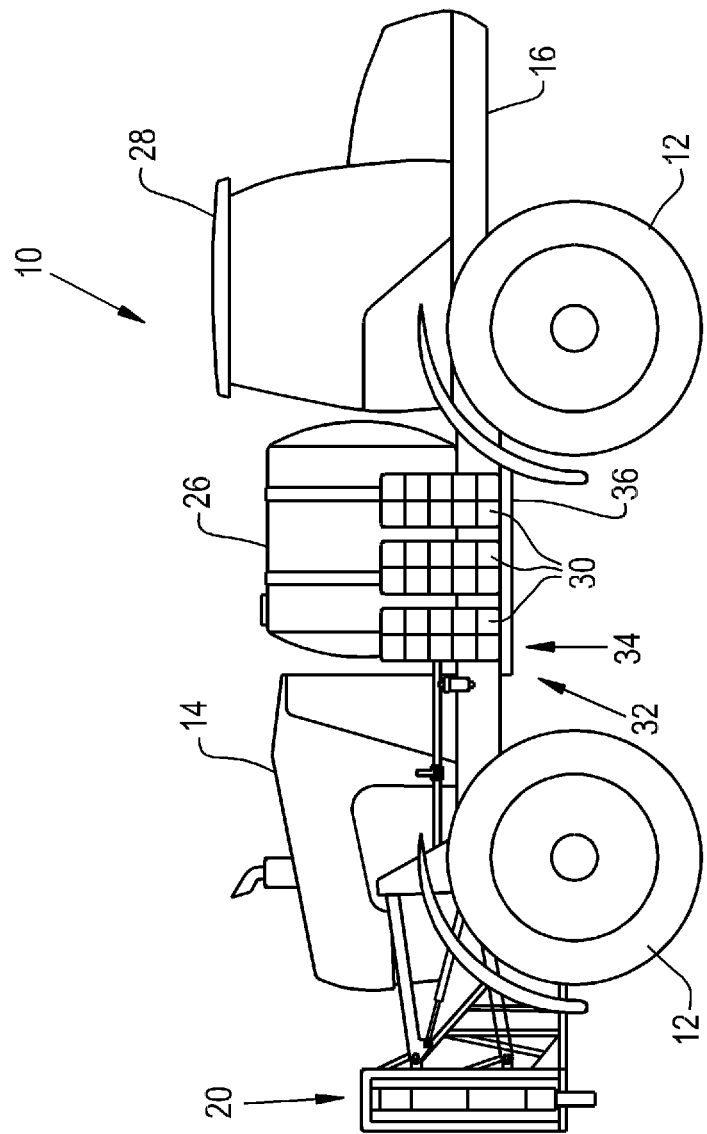
FIG. 2 is a side view of the agricultural sprayer shown in FIG. 1.

Referring now to FIG. 2, a carrier tank 26 is positioned generally in the center of chassis 16 between wing booms 18, 20 and behind an operator cab 28. Carrier tank 26 is designed to contain a carrier fluid, typically water, which is fed to the spray nozzles through a series of fluid lines (not shown). The water is mixed in a metered fashion with one or more active ingredients (i.e., agricultural chemicals such as fertilizer, herbicide or pesticide) stored in respective active ingredient tanks 30 also carried onboard sprayer 10. Metering devices for metering an active ingredient into a carrier liquid from carrier tank 26 are known in the art and not described in greater detail herein. Operator cab 28 contains a control panel (not shown) that has various operator controls for controlling operation of the sprayer and its components.

According to an aspect of the present invention, agricultural sprayer 10 includes a storage area 32 associated with chassis 16 which is configured for and dedicated to removable storage of each active ingredient tank 30. In the illustrated embodiment, storage area 32 includes a support structure 34 which is fixedly mounted to chassis 16. Support structure 34 has a generally horizontal platform 36 for supporting each active ingredient tank 30. Active ingredient tanks 30 are preferably configured as totes, in which case storage area 32 may be defined as a tote storage area.

Each active ingredient tank 30 may have any suitable predefined shape and size. In the embodiment shown, each active ingredient tank 30 has an overall rectangular shape but could have a cube or other exterior shape. Preferably each active ingredient tank 30 has a common predefined shape; however, it is also possible that active ingredient tanks 30 positioned on horizontal platform 36 may have different shapes. For example, one active ingredient tank 30 could have a rectangular shape and another active ingredient tank 30 could have a cube shape. Other predefined shapes such as a cylindrical shape are also possible. Active ingredient tanks 30 are assumed to have a size of between 40 to 50 gallons (corresponding to approximately 400 to 500 pounds each); however, other sizes of active ingredient tanks 30 are also possible. It will be appreciated that support structure 34 must be configured to support any anticipated sizes of active ingredient tanks 30, keeping in mind dynamic loading forces such as fluid sloshing and bouncing as agricultural sprayer 10 proceeds across a field.

Figure 3:
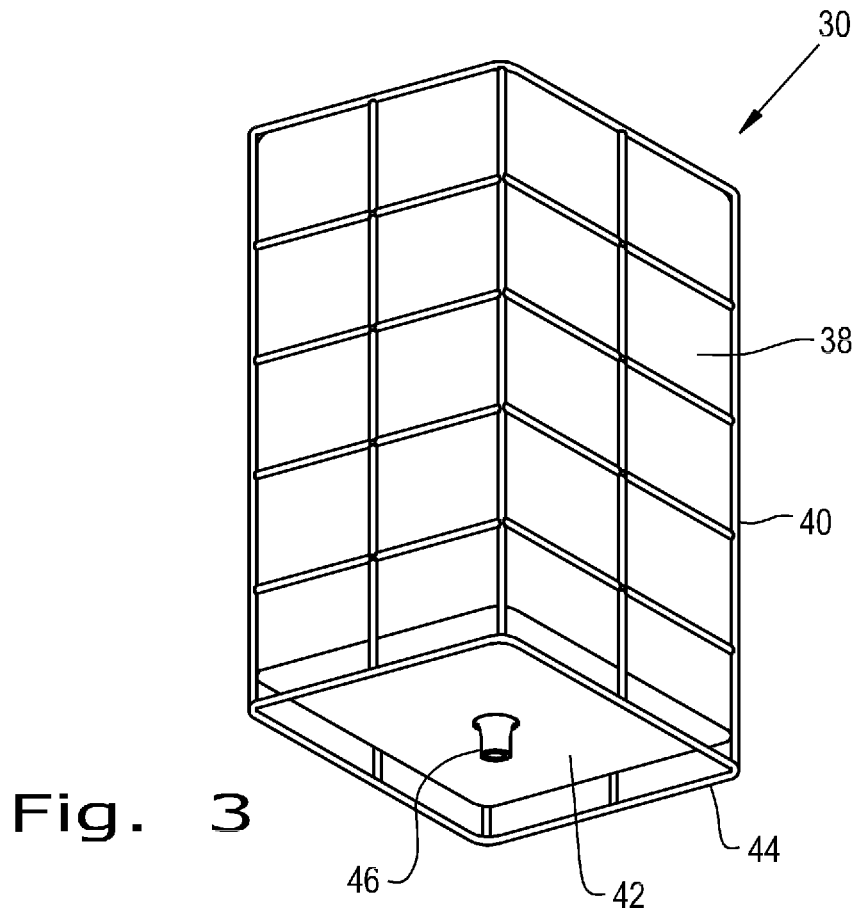
FIG. 3 is a bottom perspective view of an embodiment of an active ingredient tank which may be used with the sprayer shown in FIGS. 1 and 2.
Figure 5:
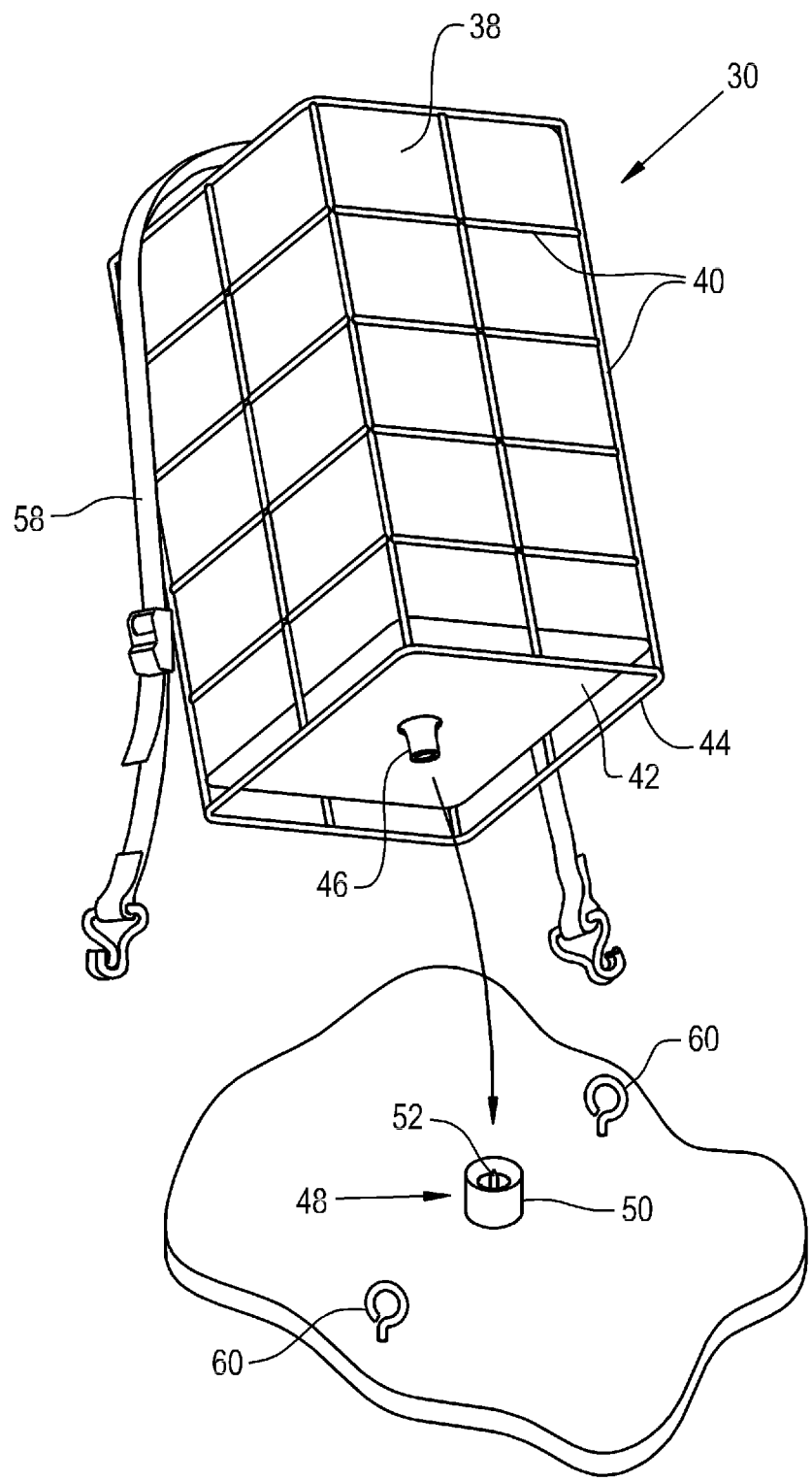
FIG. 5 is a perspective view of an active ingredient tank positioned relative to a fluid connector associated with the tote storage area.

Referring now to FIGS. 3 and 5, and as described above, each active ingredient tank 30 is preferably configured as a tote with a plastic tank 38 surrounded by a metal support structure 40. A bottom wall 42 is spaced upwardly from a bottom edge 44 of active ingredient tank 30 and supports the bottom of tank 38. Active ingredient tank 30 has a downwardly extending nozzle 46 which extends through bottom wall 42 and terminates slightly above bottom edge 44. Nozzle 46 may have any suitable shape and size, and is shown as a tapered nozzle in the illustrated embodiment.

Figure 4:
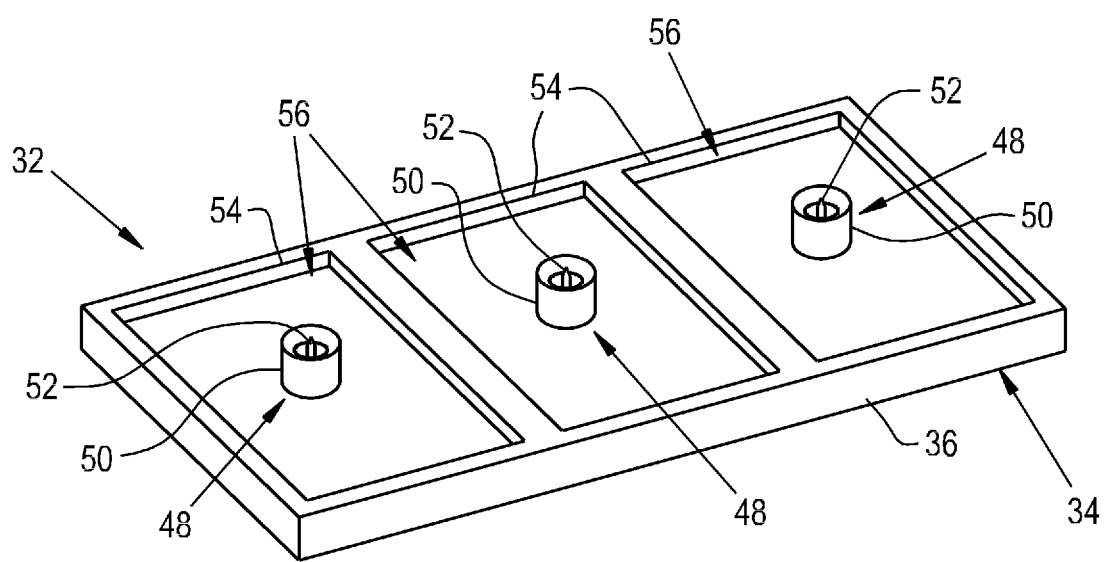
FIG. 4 is a fragmentary, top perspective view of the tote storage area on the sprayer of FIGS. 1 and 2, with the active ingredient tanks removed.

Referring now to FIGS. 4 and 5, storage area 32 includes one or more fluid connectors 48 associated therewith. Each fluid connector 48 is configured for automatically forming a sealed connection with a corresponding active ingredient tank 30 upon placement of active ingredient tank 30 within storage area 32. In the illustrated embodiment, storage area 32 includes three fluid connectors 48 associated with the three respective active ingredient tanks 30.

Each fluid connector 48 is generally configured to pierce and seal with a corresponding active ingredient tank 30.

More particularly, each fluid connector 48 includes a reservoir 50 which extends upwardly from storage area 32. A piercing member 52 is centrally located within reservoir 50 and has an upper piercing tip (not numbered) for piercing a membrane forming part of nozzle 46. Nozzle 46 has an exterior shape and size which seals with an interior shape and size of reservoir 50, and piercing of the membrane within nozzle 46 allows the active ingredient within active ingredient tank 30 to flow through fluid connector 48 to a downstream metering device (not shown).

In the embodiment shown in the drawings, nozzle 46 is positioned at the bottom of active ingredient tank 30 and automatically couples with fluid connector 48 within storage area 32. However, other types of automatic or manual fluid connector configurations are also possible. For example, nozzle 46 could be positioned at the lower side of active ingredient tank 30 and automatically or manually coupled with a fluid connector which is in fluid communication with the metering device.

Storage area 32 may be configured with optional upstanding walls 54 defining a recessed area 56 associated with each respective active ingredient tank 30. Each recessed area 56 is configured to receive a bottom edge 44 of an active ingredient tank 30 therein to reduce or eliminate movement of active ingredient tank 30 on support structure 34. Each active ingredient tank 30 may also be restrained within storage area 32 with one or more restraining devices 58. In the embodiment shown, a single restraining device in the form of a restraining strap 58 wraps around a corresponding active ingredient tank 30 and is attached at either end with an eye hook 60 extending upwardly from support structure 34.

Figure 6:
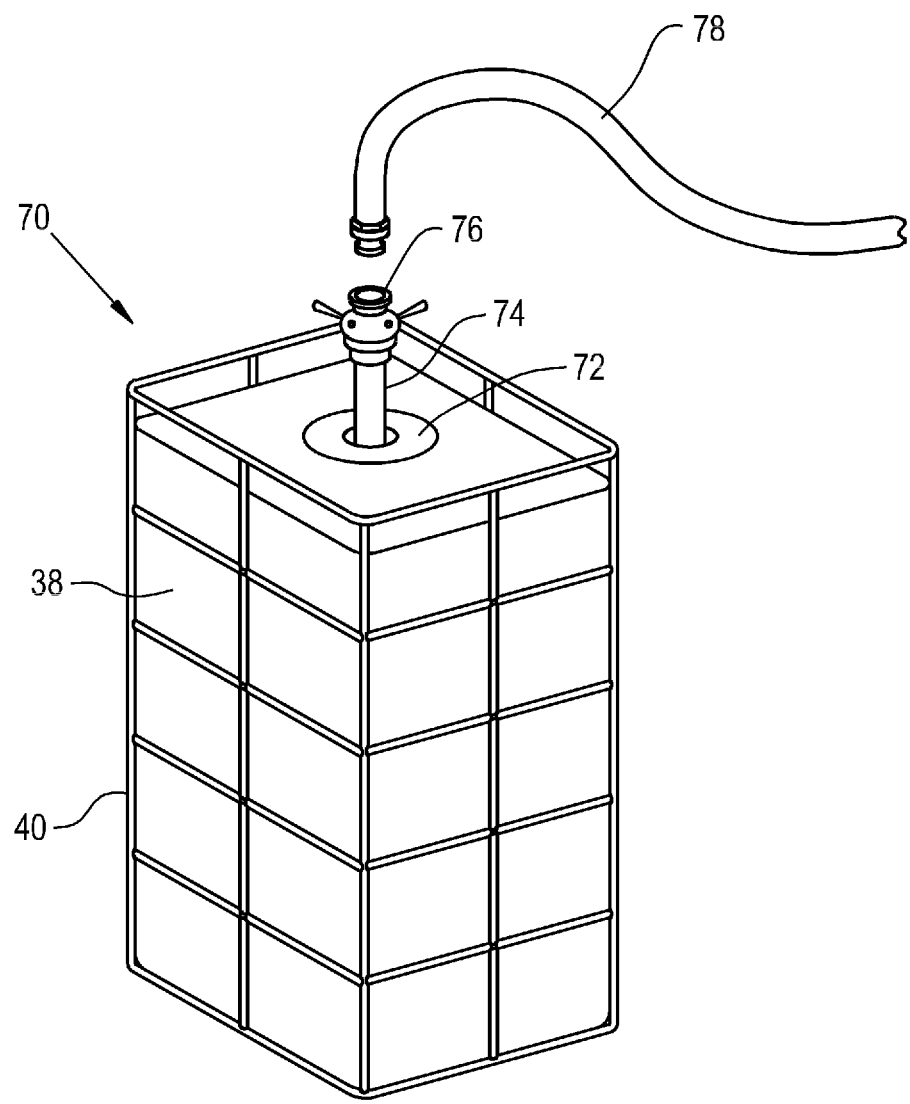
FIG. 6 is a top perspective view of another embodiment of an active ingredient tank which may be used with an agricultural sprayer of the present invention.

Referring now to FIG. 6, there is shown another embodiment of an active ingredient tank 70 which may be used with agricultural sprayer 10 of the present invention. Similar to active ingredient tank 30 described above with reference to FIGS. 2, 3 and 5, active ingredient tank 70 also is configured as a tote with an exterior shape and size which is suitable for a given application. The primary difference between active ingredient tanks 30 and 70 is that active ingredient tank 70 does not have a fluid connector arrangement (e.g., nozzle 46) at the bottom thereof which automatically connects and seals with a mating connector associated with storage area 32. Rather, active ingredient tank 70 includes a top cover 72 with a predefined shape and size which is common from one active ingredient tank 70 to the next. A suction line 74 extends through cover 72 and has a bottom end which is positioned at or near the bottom of active ingredient tank 70. Suction line 74 is preferably configured with a quick-attach fitting 76 for attachment with a corresponding fluid line 78 onboard agricultural sprayer 10 leading to the metering device. In the illustrated embodiment, quick attach fitting 76 is configured as a so-called cam and groove fitting, but could be configured as a different type of quick attach fitting.

Figure 7:
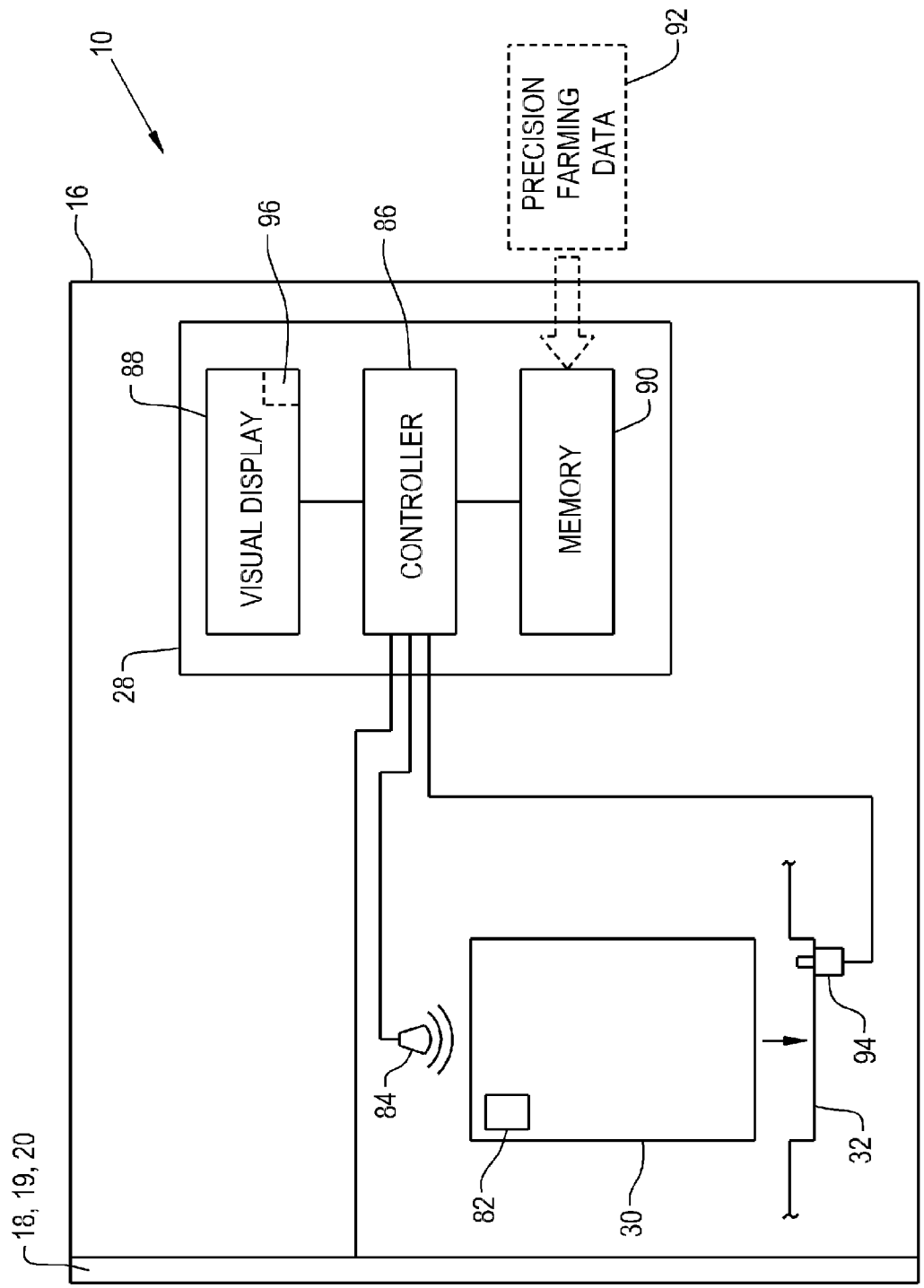
FIG. 7 is a schematic view of an embodiment of an agricultural implement in the form of a sprayer for applying an active ingredient to a geographic area.

Referring now to FIG. 7, there is shown a schematic illustration of agricultural sprayer 10 which may be used for applying an active ingredient to a geographic area, such as all or a portion of field 80 shown in FIG. 1.

According to another aspect of the present invention, active ingredient tank 30 includes an ID tag 82 which is attached or otherwise affixed thereto. ID tag 82 is shown positioned toward the top of active ingredient tank 30, but can be positioned at any suitable location allowing automated reading thereof. ID tag 82 can be any type of tag which can be read in an automated manner, such as a radio frequency identification (RFID) tag, barcode, etc. In the illustrated embodiment, ID tag 82 is in the form of an RFID tag.

Radio frequency identification (RFID) tags are well known throughout industry, and are being increasingly utilized for supply chain management, inventory management, and logistic control. These tags can be written to and read from a handheld transceiver (referred to as an RFID reader) or fixed portal. For example, an RFID tag can be placed upon a shipping container and contain data corresponding to the contents of the shipping container. The RFID tag can be read using a handheld reader or a portal reader, and the data offloaded from the reader to a computer for processing.

ID tag 82 includes data representing an active ingredient contained within active ingredient tank 30. For example, ID tag 82 can include data representing a quantity of the active ingredient within active ingredient tank 30, a type of the active ingredient within active ingredient tank 30, and/or a concentration of the active ingredient within active ingredient tank 30.

A reader 84 is carried directly or indirectly by chassis 16, and is positioned at a suitable location allowing automated reading of ID tag 82. In the illustrated embodiment, reader 84 is in the form of an RFID reader which is positioned above and to the side of active ingredient tank 30, allowing automated reading of RFID tag 82. Reader 84 can also be a barcode reader if ID tag 82 is configured as a barcode. For some applications, reader 84 need not be carried by chassis 16, but rather can be a handheld reader providing a wireless output signal.

Located within operator cab 28 are an electrical processing circuit 86, a visual display 88 and a memory 90. Visual display 88 is coupled with electronic controller 86 and provides a visual display to an operator located within operator cab 28. Visual display 88 can display a number of different types of visual information, including data associated with the active ingredient within active ingredient tank 30. Visual display 88 may be any suitable type of display, such as an LED display, LCD display, etc.

Memory 90 likewise is coupled with electronic controller 86 and may be any suitable type of memory, such as a static or dynamic memory. Memory 90 may include any type of relevant data, including precision farming data which may be generated by the operator or obtained from a number of different commercial sources (represented by the dashed box 92). Such data can be uploaded to memory 90 using any suitable technique, such as a direct wired or wireless upload, wireless Internet upload, satellite upload, etc. The precision farming data may be of different data types, such as a topographical map of the geographic area; at least one soil type associated with the geographic area; at least one application rate of the active ingredient associated with the geographic area; at least one fertility level of soil associated with the geographic area; and at least one pH level of soil associated with the geographic area. For purposes of illustration, a portion of a topographical map including soil types 80A, 80B and 80C is shown in FIG. 1.

Electrical processing circuit 86 is shown as a digital electronic controller in FIG. 7, but could also be configured as an analog type processing circuit. Electronic controller 86 is coupled with reader 84, either wired or wireless, and receives output signals from reader 84 representing data associated with the active ingredient within active ingredient tank 30. Electronic controller 86 controls operation of reader 84 to read ID tag 82 either automatically or on command. For automated reading of ID tag 82, a read trigger in the form of a switch 94 is positioned in association with active ingredient tank 30. Switch 94 is shown positioned below active ingredient tank 30 within the recessed area defined by storage area 32, but could be positioned at a different location if desired. Switch 94 is actuated when active ingredient tank 30 is placed within storage area 32, and provides an output signal to electronic controller 86. Electronic controller 86 receives the output signal from switch 94 and controls reader 84 to effect a read operation of ID tag 82.

For manual or "on command" reading of ID tag 82, and operator within operator cab 28 can manually depress a switch or button, such as a virtual button 96 on visual display 88. A corresponding output signal is provided from visual display 88 to electronic controller 86, which in turn effects the read operation of ID tag 82 using reader 84.

Electronic controller 86 receives precision farming data from memory 90 associated with the geographic area represented by field 80. Electronic controller 86 matches the data read from ID tag 82 and associated with the active ingredient within active ingredient tank 30 with the precision farming data to establish one or more application rates of the active ingredient over at least a portion of field 80. For example, assuming that the active ingredient within active ingredient think 30 is a herbicide, the application rate of the herbicide can vary for different soil types within field 80. As shown in FIG. 1, a field 80 can include multiple soil types 80A, 80B and 80C. By automatically matching the data from ID tag 82 with the precision farming data, electronic controller 86 can vary the application rate from one soil type to another as sprayer 10 moves across field 80. An operator can optionally be prompted on visual display 88 to accept the application rates based on the matched data, or can manually enter another application rate(s) by overriding the application rates based on the match data.

Figure 8:
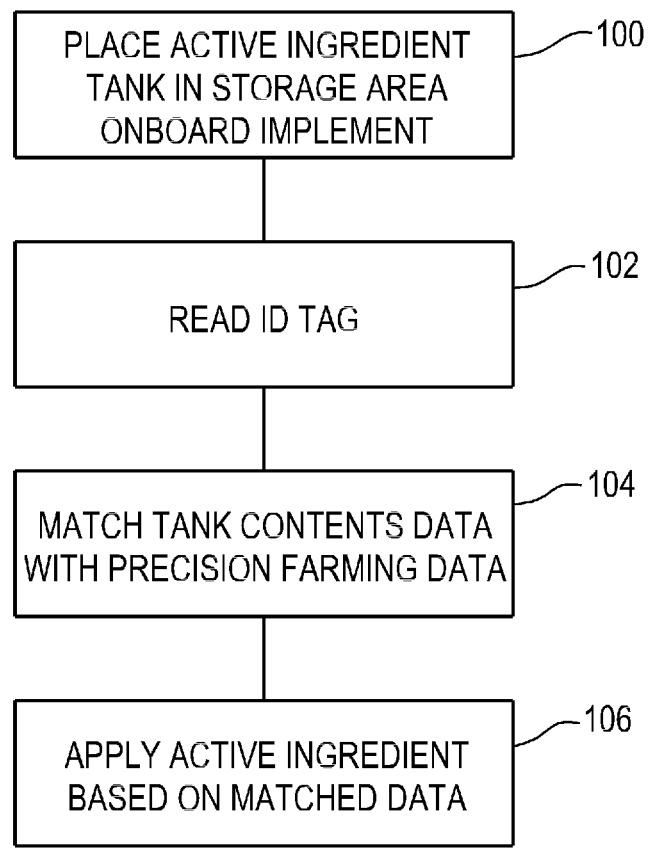
FIG. 8 is a flowchart of an embodiment of a method of the present invention for applying an active ingredient to a geographic area using the sprayer of FIG. 7.

During use of agricultural sprayer 10, carrier tank 26 is filled with a carrier liquid such as water. The active ingredient tank 30 may be offloaded to the worksite from a delivery vehicle and placed on support structure 34 within storage area 32 of sprayer 10 (FIG. 8, block 100). The active ingredient tank 30 is fluidly coupled either automatically or manually as described above, and then strapped down to support structure 34. Upon placement of active ingredient tank 30 within storage area 32, switch 94 is actuated and provides an output signal to controller 86, which in turn effects a read operation of ID tag 82 using reader 84 (block 102). Electronic controller 86 matches the contents data of active ingredient tank 30 with the precision farming data and establishes one or more application rates of the active ingredient within active ingredient tank 30 (block 104). The metering device receives both the carrier liquid from carrier tank 26, as well as the active ingredients from active ingredient tank 30, and meters the active ingredient(s) at known application rates under control of electronic controller 86 using the matched data (block 106). When the active ingredient tanks are at or near empty, they may be unstrapped, removed and replaced with another full active ingredient tank 30.

A process for reading the contents of a single active ingredient tank 30 is described above for simplicity sake. However, it is also to be understood that this same process of reading the active ingredients within multiple active ingredient tanks 30 or 70 can be effected using the same methodology.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural implement having an electrical system and being configured to apply an active ingredient to a geographic area, said agricultural implement comprising:
   a chassis;
   at least one active ingredient tank, each said active ingredient tank being removably positioned on and carried by said chassis, each said active ingredient tank including an active ingredient therein which is to be applied to the geographic area, each said active ingredient tank having an identification (ID) tag representing data associated with said active ingredient, said data associated with said active ingredient includes at least one of:
      a quantity of the active ingredient within the active ingredient tank;
      a type of the active ingredient within the active ingredient tank; and
      a concentration of the active ingredient within the active ingredient tank;
   an electrical reader configured for wirelessly reading said ID tag and providing an output signal;
   a switch supported by the chassis and being actuated in response to the positioning of the at least one active ingredient tank on the chassis, the switch generating an activation signal in response to actuation of the switch by at least one active ingredient tank; and
   an electrical processing circuit operatively connected to the switch and the reader, the electrical processing circuit automatically activating the reader in response to the activation signal so as to cause the reader to wirelessly read the ID tag and to provide the output signal to the electrical processing circuit;
   wherein:
   upon receipt of said output signal including precision farming data associated with the geographic area, the electrical processing circuit is configured to establish an application rate of the active ingredient over at least a portion of the geographic area in response to the output signal and the precision farming data; and
   the ID tag is free of a physical connection to the electrical system of the agricultural implement.

2. The agricultural implement of claim 1, wherein said precision farming data includes at least one of:
   a topographical map of the geographic area;
   at least one soil type associated with the geographic area;
   at least one application rate of the active ingredient associated with the geographic area;
   at least one fertility level of soil associated with the geographic area; and
   at least one pH level of soil associated with the geographic area.

3. The agricultural implement of claim 1, further including an operator cab and a visual display within said operator cab and coupled with said electrical processing circuit, said visual display displaying a visual indication of said data associated with said active ingredient.

4. The agricultural implement of claim 1, wherein said ID tag is one of a radio frequency identification (RFID) tag and a bar code.

5. The agricultural implement of claim 4, wherein said reader is one of an RFID reader and a bar code reader.

6. The agricultural implement of claim 1, wherein said electrical processing circuit is an electronic controller.

7. The agricultural implement of claim 1, wherein said agricultural implement is an agricultural sprayer including a storage area associated with said chassis which is configured for and dedicated to removable storage of each said active ingredient tank.

8. The agricultural implement of claim 7, further including at least one fluid connector associated with said storage area, each said fluid connector forming a sealed connection with a corresponding said active ingredient tank.

9. The agricultural implement of claim 7, wherein said storage area is a tote storage area, and each said active ingredient tank is configured as a tote.

* * * * *